R. NIELSEN.
ICE CREAM CONE FILLER.
APPLICATION FILED JUNE 16, 1909.
1,078,209.
Patented Nov. 11, 1913.
2 SHEETS—SHEET 1.
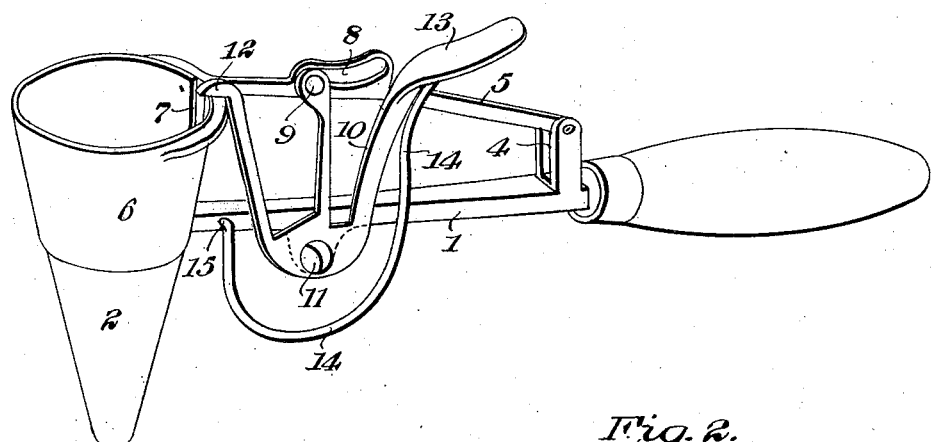
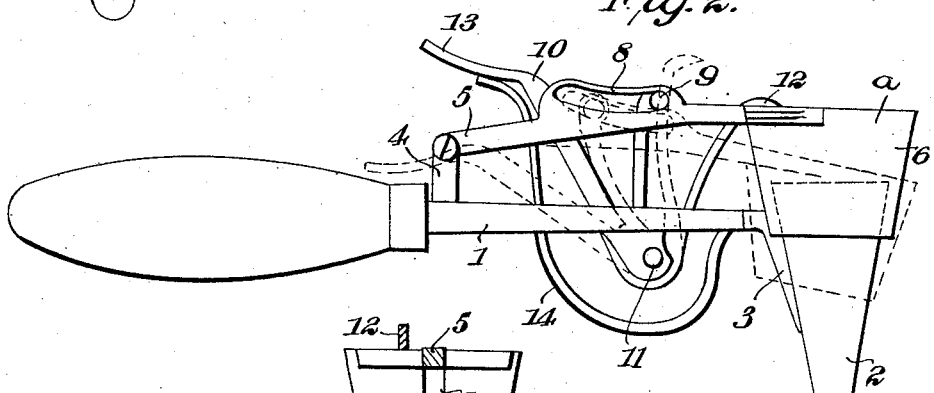
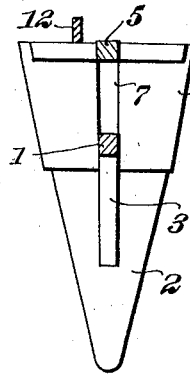
Witnesses
J. A. Bishop
Inventor
R. Nielsen,
Attorney R. NIELSEN.
ICE CREAM CONE FILLER.
APPLICATION FILED JUNE 16, 1909.
1,078,209.
Patented Nov. 11, 1913.
2 SHEETS—SHEET 2.
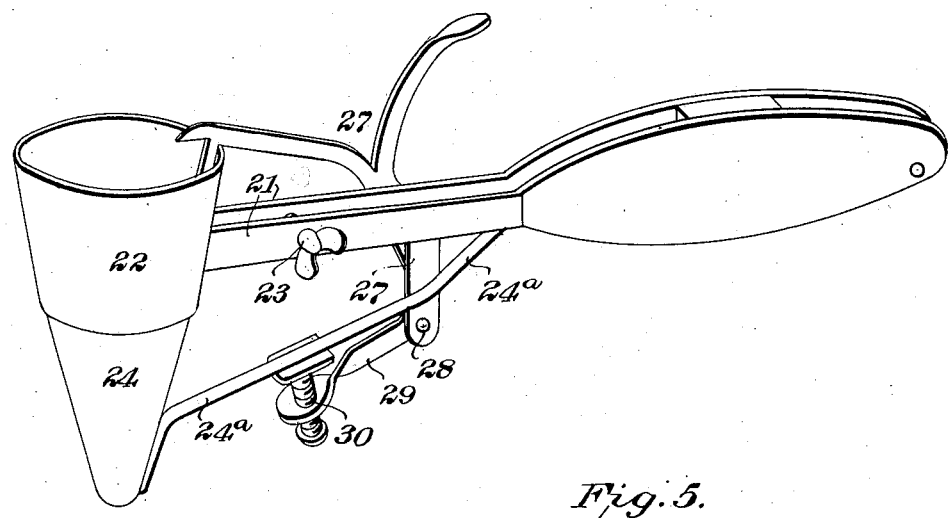
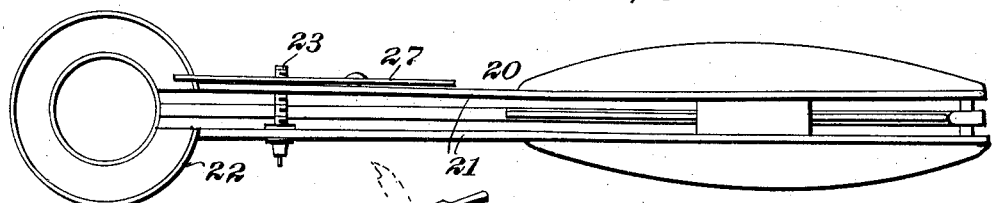
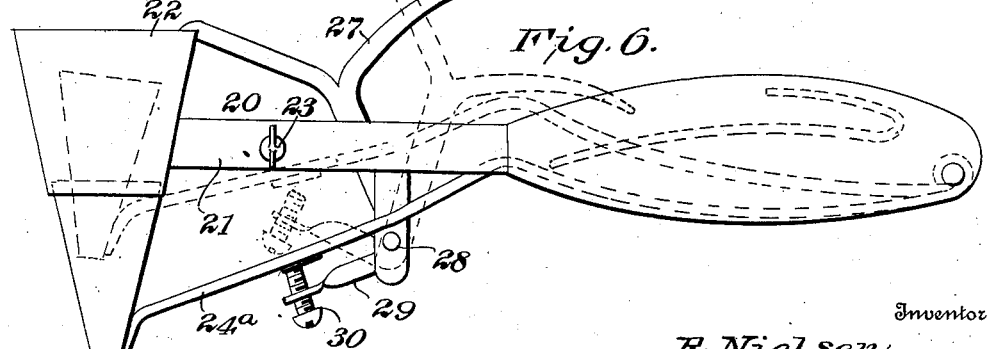

UNITED STATES PATENT OFFICE.

RASMUS NIELSEN, OF TROY, NEW YORK.

ICE-CREAM-CONE FILLER.

1,078,209.  Specification of Letters Patent.  Patented Nov. 11, 1913.

Application filed June 16, 1909. Serial No. 502,622.

*To all whom it may concern:*

Be it known that I, RASMUS NIELSEN, a citizen of the United States, residing at Troy, in the county of Rensselaer and State of New York, have invented certain new and useful Improvements in Ice-Cream-Cone Fillers, of which the following is a specification.

My invention relates to improvements in ice cream dishing devices, designed primarily for filling what is commonly known to the trade as ice cream cones.

The prime object of the invention is to provide a receptacle to receive the cone, having a part which is movable and operable by one dishing cream so that after the cone has been filled the same can be raised in the holder by manipulating the handle or trigger.

A further object of the invention is to provide convenient means on the handle for elevating the cone above the holder and adjusting the latter to accommodate cones of varying sizes, and adapted to hold the cone in place during the filling operation, yet readily permit of its withdrawal after it is filled.

The invention also relates to the specific details of construction and arrangement of parts which will be hereinafter described and particularly pointed out in the claims.

Referring to the drawings, Figure 1, is a perspective view of one form of my improved disher. Fig. 2, is a side elevation of the same showing the movable section depressed in dotted lines. Fig. 3, is a detail perspective view of the rear of the cone holder. Fig. 4, is a perspective view of another form of my invention. Fig. 5, is a plan view of the same, and Fig. 6, is a side elevation of the same showing the movable section in operative position in dotted lines.

The numeral 1, represents a handle member provided on its end with a cone holder section 2, having a rib 3, on its rear side. Extending upwardly from the handle 1, are ears 4, in which is pivotally mounted an arm 5, of an upper cone holder section 6. The upper cone holder section 6, is formed with a slot 7, which fits over the rib 3, to guide the parts when operating to project the cone. The arm 5, is formed with a slot 8, in which fits a pin 9, of a trigger lever 10, pivoted to the handle at 11. The trigger lever is formed at its forward end with a projection 12, which extends over the upper edge of the movable cone holder section, and at its rear end it is provided with a finger piece 13, by means of which it can be tilted on its pivot 11, to operate the cone section 6, as will be described. The trigger lever 10, and the upper cone holder section 6, are maintained in normal position by means of a spring 14, secured to the handle 1, at 15, and bears against the under side of the finger piece 13. The operation of this form of my invention is substantially as follows: The finger piece 13, is depressed as shown in dotted lines in Fig. 2, which by reason of the point of pivot, throws the extension 12, rearwardly and away from the cone holder section 6, and by reason of the inclination of the slot 8, when said lever is depressed causes the arm 5, hence the upper cone holder section 6, to be pressed outwardly as indicated in dotted lines Fig. 2. When in this position the ice cream cone is placed in the lower cone holder section 2, whereupon pressure upon the finger piece 13, is removed and the spring raises the parts to normal position. It will be observed at this point that in the normal position the projection 12, fits snugly over the upper edge of the cone holder section 6, and prevents the cone $a$, from falling from its position during the operation of dipping as will be obvious. The cone holder is now thrust into the cream which of course fills the cone $a$, and after the latter operation the vender depresses the finger piece 13, as before described, which forces down the upper cone holder section 6, and exposes the upper portion of the cone $a$, filled with cream so that the customer withdraws it from the cone holder section 2, and thereby obviates the necessity of the dealer handling the filled cone in passing the same to the customer.

In the form of the invention shown in Figs. 4, 5, and 6, the same principle is involved but the construction is slightly different however, the result accomplished being the same. The handle 20, is made in two sections 21—21, and has attached to the free ends thereof, the ends of an upper cone holder section 22, which may be adjusted to increase or decrease its diameter by means of a set screw 23, passing through the handle members 21—21. The lower cone holder section 24, is provided with an arm $24^a$, and is pivotally mounted between the handle sections 21, and the upper end of said cone holder section fitting within the upper cone holder section 22. The trigger lever 27, is mounted on the handle at 28, and is provided with an extension which overhangs the upper edge of the upper cone holder section, and its lower edge has a forwardly extending member 29, which receives a set screw 30, bearing against the arm 24, to regulate the length of the cone holder. This form of the invention permitting the regulation of the size of the cone to be handled is of great advantage. The members 21—21 of the handle may be opened up by manipulating the screw to alter the size of the upper cone holder section, and then by turning the screw 30, the lower cone holder section may be adjusted to accommodate the bottom of the upper cone holder section. It will thus be seen that I have provided in this form of the invention means for receiving cones of different diameters, and means for increasing and decreasing the length of the cone holder to compensate for cones of different lengths.

Cones can be quickly filled with cream by simply scooping the same in the receptacle, and by manipulating the finger piece, the filled cone can be quickly positioned to be removed. According to the arrangement of parts the vender has no occasion to touch the filled cone with his hands, thereby insuring cleanliness and to a considerable extent reducing to a minimum, the transference of germs, which is so frequent in the present method of handling cones.

By reference to Fig. 2, it will be observed that the pin 9, is located slightly in advance of the pivot 11, so that when pressure is applied to the edge of the upper cone holder section 6, the latter cannot be collapsed or telescoped on the lower cone holder section, thereby preventing breaking of the edges of the cone, which would likely occur if the upper cone holder section should be moved during the operation of filling. This is also true of the construction shown in Figs. 4, 5, and 6, but as the upper cone holder section in this instance is formed with the handle, obviously it could not be moved in the same sense as in the preferred form of the invention.

The invention is extremely simple and is so constructed as to be readily cleaned for sanitary purposes, and adds greatly to the convenience of handling ice cream cones.

What I claim is:

1. A device of the character described, comprising a handle, a cone holder consisting of upper and lower sections, the lower section extending below the upper section, the said upper and lower sections forming a cone of substantially the length of the frangible cone being filled, and means on the handle for telescoping the sections and elevating the frangible cone above the upper one of said sections.

2. A device of the character described, comprising a handle, a cone holder at the end of the handle, said cone holder comprising upper and lower sections, the lower section fitting within the upper section and extending below the latter, the said upper and lower sections forming a cone of substantially the length of the frangible cone being filled, a device on the handle engaging the upper edge of the frangible cone for holding the latter in the cone holder during the dipping operation, and means for telescoping the sections to force a frangible cone above the upper section.

3. A device of the character described, comprising a handle, a cone holder mounted at the end of the handle and including telescoping sections, means for guiding the two sections toward and from each other, a lever for collapsing the cone holder sections to force a cone above the edge of the upper section, said lever having a projection which overlies the edge of the upper cone holder section to hold the cone in position, and means for holding the lever in normal position.

4. A device of the character described, comprising a handle, a cone holder at the end of the handle and including two telescoping sections, one of said sections being mounted on a pivotally mounted arm carried by the handle, a trigger lever for operating the arm to collapse the sections to force a cone above the upper section, and means for returning the sections to normal position.

5. A device of the character described, comprising a handle, a cone holder at the end of the handle and including two telescoping sections, one of said sections being mounted on a pivotally mounted arm carried by the handle, a trigger lever for operating the arm to collapse the sections to force a cone above the upper section, said lever having an extension to prevent displacement of the cone in the holder during the filling operation and means for returning the lever to normal position.

6. A device of the character described, comprising telescoping sections, a handle supporting one section, a pivoted arm supporting the other section, a spring actuated lever for telescoping the sections, to project a cone beyond the edge of the upper section, and a spring for returning the sections to normal position.

7. A device of the character described, comprising a handle, two sections, one of said sections being mounted on the handle, a pivoted lever, the other said section being mounted on the pivoted lever, a trip lever for collapsing the sections to expose the upper end of a cone beyond the upper section, and means preventing the collapsing of the sections during the operation of filling a cone.

8. A device of the character described, comprising a cone holder including collapsible sections, means for increasing the diameter of one section, means for lengthening or shortening the length of the cone holder, and a trip lever for collapsing the sections to expose the upper end of a cone above the upper section.

In testimony whereof I affix my signature in presence of two witnesses.

RASMUS NIELSEN.

Witnesses:
  L. H. GILES,
  NELS NIELSEN.

---

Copies of this patent may be obtained for five cents each, by addressing the "Commissioner of Patents, Washington, D. C."